PHONOGRAPH TURNTABLE MECHANISM

Filed Aug. 9, 1950

Inventor
Arthur W. Sear
by Merton D Morse
His Attorney

Patented Feb. 3, 1953 2,627,414

UNITED STATES PATENT OFFICE 2,627,414

PHONOGRAPH TURNTABLE MECHANISM

Arthur W. Sear, Syracuse, N. Y., assignor to General Electric Company, a corporation of New York Application August 9, 1950, Serial No. 178,527

5 Claims. (Cl. 274—9)

Figures 1, 2:
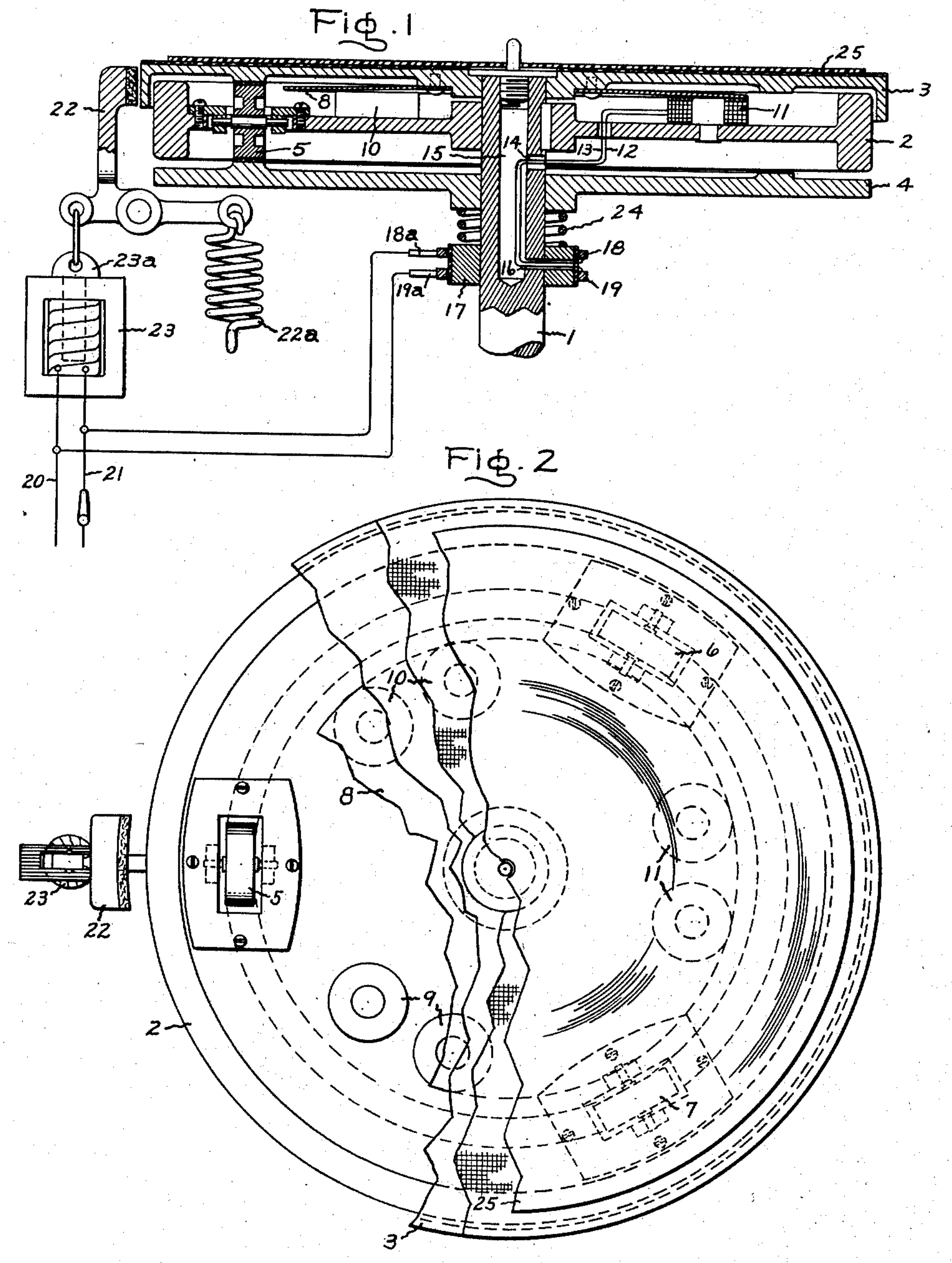

My invention relates to phonograph turntable mechanisms and, more particularly, to rapid start and stop mechanisms for phonograph turntables.

In certain phonograph machines used to record sounds and to reproduce recorded sounds, a disc type record is carried on a turntable. It is frequently desirable that the turntable be stopped and started abruptly with a negligible transient period. The stops and starts must be accomplished abruptly because the pitch of the sound produced depends on the speed of the turntable, and the human ear can detect small changes in the pitch of a sound. In order to minimize variations in the speed of rotation of the drive shaft driving such a turntable, it is desirable to have connected to the drive shaft a device, such a flywheel, having a high moment of inertia with respect to the drive shaft. However, the turntable cannot be stopped and started quickly while it is secured to a drive mechanism which also drives a flywheel.

Therefore, an important object of my invention is to provide an improved phonograph turntable mechanism which has a high moment of inertia with respect to the drive shaft and which can be stopped and started abruptly with no perceptible change in the pitch of the sound being recorded or being reproduced.

Another object of my invention is to provide an improved phonograph turntable mechanism which can be started or stopped abruptly with no perceptible change in the pitch of the sound being recorded or being reproduced and which is both durable and simple in construction.

In carrying out my invention in one embodiment thereof a phonograph turntable is coupled through a magnetic clutch to a main flywheel. The main driving flywheel is secured to a shaft which is rotated at a predetermined speed. A second auxiliary flywheel is rotatably mounted on the shaft and has a moment of inertia with respect to the shaft which is equal to the moment of inertia with respect to the shaft of the turntable and a disc type phonograph record. The main flywheel is provided with rollers or other friction means for driving the auxiliary flywheel at twice the speed of rotation of the main flywheel whenever the turntable is stopped. In accordance with the principle of the conservation of angular momentum, the total angular momentum of the turntable mechanism remains substantially constant during the acceleration of the turntable and the record.

The features of my invention which I believe to be novel are set forth with particularity in the appended claims. My invention itself, however, both as to its organization and method of operation, together with further objects and advantages thereof, may best be understood by reference to the following description in connection with the accompanying drawing, in which Fig. 1 is a sectional view in elevation of a phonograph turntable mechanism embodying my invention; and Fig. 2 is a plan view in partial section of a phonograph turntable mechanism embodying my invention.

Referring to the drawing, the shaft 1 is rotated at a predetermined speed. The main flywheel 2 is keyed to shaft 1 between the phonograph turntable 3 and the auxiliary flywheel 4. The rollers 5, 6, and 7 are mounted in the web of flywheel 2. Rollers 5, 6, and 7 rotate on axes which lie on radii of flywheel 2 and bear on turntable 3 and auxiliary flywheel 4.

Turntable 3 is controllably engaged with main flywheel 2 through an electromagnetic clutch mechanism. The driven member of this clutch mechanism is the annular, flexible, iron disc 8 secured to the bottom of turntable 3. The driving member consists of the three pairs of electromagnets 9, 10, and 11 mounted on the upper face of main flywheel 2. Electromagnets 9, 10, and 11 are each connected across the conductors 12 and 13. Conductors 12 and 13 are passed through the radial aperture 14 in shaft 1, the longitudinal aperture 15 in shaft 1, and the radial aperture 16 in shaft 1 and in retaining disc 17. Conductors 12 and 13 are connected to the slip rings 18 and 19 respectively. Slip rings 18 and 19 are secured circumferentially about and insulated from retaining disc 17. The brushes 18a and 19a connect slip rings 18 and 19, respectively, to the supply conductors 20 and 21.

In order that turntable 3 may be stopped quickly when the magnetic clutch mechanism is de-energized, the brake lever 22 is provided with a spring 22a to hold lever 22 normally in firm contact with turntable 3. The solenoid 23 is provided with a movable iron core 23a which is connected to lever 22. Solenoid 23 is connected across supply conductors 20 and 21 in parallel relation with electromagnets 9, 10, and 11. When solenoid 23 is energized core 23a is drawn into solenoid 23 thereby disengaging lever 22 from turntable 3 at the same time that the magnetic clutch mechanism is energized. The spring 24 is arranged in compression between auxiliary flywheel 4 and retaining disc 17.

Spring 24 holds auxiliary flywheel in contact with rollers 5, 6, and 7 which, in turn, bear on turntable 3. The moment of inertia of auxiliary flywheel 4 with respect to shaft 1 is made approximately equal to the total moment of inertia with respect to shaft 1 of turntable 3 and the disc type phonograph record 25.

To start the turntable mechanism the magnetic clutch mechanism is energized, solenoid 23 is also energized and lever 22 is held disengaged as shown. Turntable 3, flywheel 2, flywheel 4, and record 25 rotate about shaft 1 at the same speed. The friction forces between auxiliary flywheel 4 and the peripheries of rollers 5, 6, and 7 cause auxiliary flywheel 4 to rotate about shaft 1 at the same speed as flywheel 2.

When the magnetic clutch mechanism is de-energized solenoid 23 is de-energized and brake lever 22 is operated to stop turntable 3. The friction forces between turntable 3 and rollers 5, 6, and 7 drive rollers 5, 6, and 7 in rotation about their respective axes thereby supplying additional energy to auxiliary flywheel 4 and driving flywheel 4 at twice the speed of rotation of flywheel 2.

If solenoid 23 is energized once more, lever 22 is again pulled away from turntable 3. Turntable 3 starts rotating. Rollers 5, 6, and 7 stop rotating, and the speed of auxiliary flywheel 4 is decreased to the speed of flywheel 2. These changes in speed take place simultaneously and almost instantaneously. The energy required to accelerate turntable 3 is supplied by the deceleration of flywheel 4.

During both modes of operation mentioned above, the turntable rotating and the turntable at a standstill, shaft 1 and flywheel 2 continue to rotate at substantially the same speed. The application of the external braking force causes a slight decrease in the speed of shaft 1. However, turntable 3 is itself stopped abruptly and shaft 1 stabilizes at the predetermined operating speed before turntable 3 is freed for rotation once more. The effects on the pitch of the sound reproduced are not perceptible to the human ear.

In accordance with the known principle of the conservation of angular momentum, the total momentum of the turntable mechanism is substantially the same in either mode of operation.

If:

W is the angular velocity of shaft 1, $M_I$ is the total momentum of the turntable mechanism when turntable 3 stopped, $M_{II}$ is the total momentum of the system when turntable 3 is rotating, and the moment of inertia of each part with respect to shaft 1 is indicated by the letter I with the appropriate subscript, $$M_I = I_2W + I_4(2W)$$
$$M_{II} = I_2W + (I_3 + I_{25})W + I_4W$$

but $I_4 = I_3 + I_{25}$ as previously mentioned. Therefore, $M_I = M_{II}$.

The effect on the turntable mechanism of the torques applied to record 25 by a recording arm or a pick-up arm are negligible.

Of course, the moment of inertia of flywheel 4 with respect to shaft 1 can be made exactly equal to the total moment of inertia of turntable 3 and record 25 at only one weight and diameter of record. However, the normal variations in weight and inertia of phonograph records cause a negligible change in the total moment of inertia.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. In a phonograph turntable mechanism having a vertical drive shaft, a phonograph turntable arranged to carry a record member rotatably mounted on the upper end of said vertical drive shaft, a main flywheel secured to said drive shaft below said turntable and arranged for rotation at a substantially constant speed, a clutch mechanism secured to said turntable and said main flywheel for rotating said turntable in response to engagement of said clutch mechanism, an auxiliary flywheel having a moment of inertia with respect to said shaft substantially equal to the total moment of inertia with respect to said shaft of said turntable and said record member rotatably mounted on said drive shaft below said main flywheel, a plurality of rollers rotatably mounted in the face of said main flywheel having their axes of rotation in radii of said main flywheel and each having its periphery in contact with said turntable and with said auxiliary flywheel for driving said auxiliary flywheel concurrently with said main flywheel while said turntable is rotating and for driving said auxiliary flywheel at twice the speed of said main flywheel while said turntable is stopped, spring means acting longitudinally with respect to said shaft for holding said auxiliary flywheel in contact with said rollers, and a brake device for stopping said turntable when said clutch mechanism is disengaged.

2. In a phonograph turntable mechanism having a vertical drive shaft, a phonograph turntable rotatably mounted on the upper end of said vertical drive shaft, and having a disc type phonograph record carried by said turntable, a main flywheel secured to said drive shaft below said turntable and continuously driven in rotation at a predetermined speed by said drive shaft, a pair of supply conductors, a manually controlled electromagnetic clutch device comprising an annular, flexible iron disc secured to the lower side of said turntable, a plurality of electromagnets secured to the upper side of said main flywheel and disposed circularly about said shaft, circuits for energizing said electromagnets, an auxiliary flywheel rotatably mounted on said shaft below said main flywheel and having a moment of inertia with respect to said shaft substantially equal to the total moment of inertia with respect to said shaft of said phonograph turntable and said disc type phonograph record, a plurality of rollers rotatably mounted in the web of said main flywheel having their axes of rotation on radii of said main flywheel and each having its periphery in contact with said turntable and with said auxiliary flywheel for driving said auxiliary flywheel at the speed of rotation of said main flywheel while said turntable is engaged with said main flywheel and for driving said auxiliary flywheel at twice the speed of rotation of said main flywheel while said turntable is stopped, spring means acting longitudinally with respect to said drive shaft for holding said auxiliary flywheel in contact with said rollers, and a brake device for stopping said turntable when said clutch mechanism is disengaged.

3. In a phonograph turntable mechanism having a vertical drive shaft, a phonograph turntable rotatably mounted on the upper end of said vertical drive shaft, and having a disc type phonograph record carried by said turntable, a main flywheel secured to said drive shaft below said turntable and continuously driven in rotation at a predetermined speed by said drive shaft, a pair of supply conductors, a manually controlled electromagnetic clutch device comprising an annular, flexible, iron disc secured to the lower side of said turntable, a plurality of electromagnets secured to the upper side of said main flywheel and disposed circularly about said shaft, a pair of slip rings secured to the circumference of said retaining disc and insulated therefrom, a pair of current-collecting devices each in contact with a different one of said slip rings, circuits connecting each of said current-collecting devices to a different one of said supply conductors, a longitudinal concentric aperture in the upper end of said shaft and extending through said shaft to the lower side of said retaining disc, a radial aperture in said shaft adjacent to said main flywheel, radial apertures in said shaft and in said retaining disc having coinciding longitudinal axes, circuits passing through said apertures for connecting each of said electromagnets across said slip rings, an auxiliary flywheel rotatably mounted on said shaft below said main flywheel and having a moment of inertia with respect to said shaft substantially equal to the total moment of inertia with respect to said shaft of said turntable and said disc type phonograph record, a plurality of rollers rotatably mounted in the face of said main flywheel having their axes of rotation on radii of said main flywheel and each having its periphery in contact with said turntable and with said auxiliary flywheel for driving said auxiliary flywheel at the speed of rotation of said main flywheel in response to the engagement of said clutch mechanism and for driving said auxiliary flywheel at twice the speed of rotation of said main flywheel in response to the disengagement of said clutch mechanism, a retaining disc secured concentrically to said shaft below said auxiliary flywheel, a spring disposed concentrically about said shaft and in compression between said retaining disc and said auxiliary flywheel, a brake lever, spring operated means for holding said brake lever in contact with said turntable for stopping said turntable, a solenoid having a movable iron core secured to said brake lever, and a circuit connected in parallel relationship with said electromagnets for energizing said solenoid to overcome the effect of said spring operated means and pull said brake lever away from said turntable.

4. A turntable mechanism comprising, a drive shaft, a turntable arranged to carry a record member and rotatably mounted on said drive shaft, a main flywheel secured to said drive shaft adjacent said turntable, an auxiliary flywheel rotatably mounted on said drive shaft adjacent said main flywheel, said auxiliary flywheel having a moment of inertia with respect to said shaft substantially equal to the total moment of inertia with respect to said shaft of said turntable and said record member, a plurality of rollers rotatably mounted on said main flywheel each arranged with its periphery in contact with said turntable and with said auxiliary flywheel for driving said auxiliary flywheel at the same speed as said main flywheel when said turntable is rotating at the same speed as said main flywheel and for driving said auxiliary flywheel at twice the speed of said main flywheel when said turntable is stopped, and a clutch mechanism associated with said main flywheel for selectively rotating said turntable at the same speed as said main flywheel.

5. In a quick-start mechanism for phonographs, the combination of a drive shaft, a driving flywheel affixed thereto, a second flywheel and a record turntable positioned on opposite sides of said driving flywheel and independently journalled for rotation about the axis of said shaft, said second flywheel having a moment of inertia with respect to said axis substantially equal to the combined moment of inertia with respect to said axis of the record on the turntable and said record turntable, friction drive means carried by said driving flywheel and engaging both said turntable and second flywheel for rotation with respect thereto, a clutch interposed between said driving flywheel and turntable and arranged selectively to rotate said turntable at the same speed as said driving flywheel when engaged, and a stationary brake arranged to stop said turntable upon disengagement of said clutch, said driving flywheel and said turntable being arranged to cause said friction drive means to rotate when said turntable is braked, said friction drive means being thereby caused to drive said second flywheel at increased speed when said drive means is caused to rotate, whereby when said clutch is subsequently re-engaged and said brake is released from said turntable and momentum of said second flywheel is transferred to said turntable through said drive means to assist in acceleration thereof.

ARTHUR W. SEAR.

REFERENCES CITED

The following references are of record in the file of this patent:

UNITED STATES PATENTS

| Number | Name | Date |
|---|---|---|
| 2,278,680 | Thompson | Apr. 7, 1942 |
| 2,525,946 | Roberts | Oct. 17, 1950 |

FOREIGN PATENTS

| Number | Country | Date |
|---|---|---|
| 324,781 | Great Britain | Feb. 6, 1930 |
| 422,473 | Great Britain | Jan. 10, 1935 |